United States Patent
Horton et al.

(10) Patent No.: US 11,013,584 B2
(45) Date of Patent: May 25, 2021

(54) ORAL HYGIENE INSTRUMENT

(71) Applicants: Michael Horton, Oakland, CA (US); Valencia Burton, Oakland, CA (US)

(72) Inventors: Michael Horton, Oakland, CA (US); Valencia Burton, Oakland, CA (US)

( * ) Notice: Subject to any disclaimer, the term of this patent is extended or adjusted under 35 U.S.C. 154(b) by 163 days.

(21) Appl. No.: 16/135,368

(22) Filed: Sep. 19, 2018

(65) Prior Publication Data
US 2020/0085550 A1 Mar. 19, 2020

(51) Int. Cl.
*A61C 15/04* (2006.01)
*A46B 15/00* (2006.01)

(52) U.S. Cl.
CPC ........ *A61C 15/048* (2013.01); *A46B 15/0071* (2013.01)

(58) Field of Classification Search
CPC ... A61B 17/244; A61C 15/048; A61C 15/046; A46B 15/0071; A46B 15/0073
See application file for complete search history.

(56) References Cited

U.S. PATENT DOCUMENTS

| | | | | |
|---|---|---|---|---|
| 691,581 A * | 1/1902 | Baumeister | ............ | A61C 15/00 132/309 |
| 736,650 A * | 8/1903 | Storms, Jr. | ............ | A45D 44/18 132/309 |
| 788,947 A * | 5/1905 | Roth | ............ | H61C 15/046 132/323 |
| 893,345 A * | 7/1908 | Monson | | |
| 2,180,522 A * | 11/1939 | Henne | ............ | A61C 15/046 132/323 |
| 2,187,899 A * | 1/1940 | Henne | ............ | A61C 15/046 132/323 |
| 2,443,415 A * | 6/1948 | Buscarino | ............ | A61C 15/046 132/323 |
| 3,474,799 A * | 10/1969 | Cappello | ............ | A61C 15/046 132/323 |
| 3,927,686 A * | 12/1975 | Zambito | ............ | A61C 15/048 132/323 |
| 4,162,687 A * | 7/1979 | Lorch | ............ | A61C 15/046 132/323 |
| 4,753,254 A * | 6/1988 | McCullough | ........ | A61C 15/046 132/323 |
| 4,776,357 A * | 10/1988 | McCullough | ........ | A61C 15/046 132/327 |
| 5,067,503 A * | 11/1991 | Stile | ............ | A61C 15/046 132/323 |
| 5,279,315 A * | 1/1994 | Huang | ............ | A61C 15/046 132/323 |
| 5,931,171 A * | 8/1999 | Landis | ............ | A61C 15/046 132/323 |
| 7,191,784 B2 * | 3/2007 | Landis | ............ | A61C 15/046 132/323 |

(Continued)

*Primary Examiner* — Rachel R Steitz
*Assistant Examiner* — Brianne E Kalach
(74) *Attorney, Agent, or Firm* — Kilpatrick Townsend & Stockton LLP (57) ABSTRACT

An oral hygiene instrument includes a handle for gripping by a user and a dental floss assembly coupled with the handle. The dental floss assembly includes a support frame and a length of dental floss attached to the support frame for flossing between teeth. The support frame is selectively rotatable relative to the handle around an axis of rotation.

4 Claims, 9 Drawing Sheets

(56) References Cited

U.S. PATENT DOCUMENTS

| | | | | |
|---|---|---|---|---|
| 7,478,452 B2* | 1/2009 | Rosenblood | ............ | A61B 17/24 |
| | | | | 15/111 |
| 8,893,733 B2* | 11/2014 | Welt | .................... | A46B 5/0075 |
| | | | | 132/323 |
| 2006/0027246 A1* | 2/2006 | Wilkinson | ............. | A45D 44/18 |
| | | | | 132/309 |
| 2010/0269280 A1* | 10/2010 | Thomas | ............. | A61C 17/3481 |
| | | | | 15/167.1 |
| 2018/0035797 A1* | 2/2018 | Mahawar | ................. | A46B 9/04 |

* cited by examiner

ORAL HYGIENE INSTRUMENT

BACKGROUND

The American Dental Association recommends daily use of an interdental cleaner (e.g., dental floss) to clean in between teeth. Cleaning between teeth with dental floss, on a suitable regular basis, may help prevent cavities and gum disease by removing plaque and/or stuck food fragments. Some people, however, do not floss their teeth on a suitable regular basis due to dissatisfaction with existing approaches for flossing teeth.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In many embodiments, an oral hygiene instrument includes an elongated handle and a dental floss assembly coupled with the handle so as to selectively rotatable relative to the handle. The dental floss assembly includes a length of dental floss held by a support frame. The elongated handle allows a person to floss between teeth with the length of dental floss without having to reach inside the mouth. The ability to selectively rotate the dental floss assembly relative to the handle enables selective tailoring of the orientation of the length of dental floss for flossing between specific adjacent teeth. The ability to floss teeth without having to reach into the mouth, coupled with the ability to tailor the orientation of the length of dental floss for flossing between specific adjacent teeth, may sufficiently improve the dental flossing experience so as to increase the frequency of flossing by some people.

Thus, in one aspect, an oral hygiene instrument includes a handle for gripping by user and a dental floss assembly coupled with the handle. The dental floss assembly includes a support frame and a length of dental floss attached to the support frame for flossing between teeth. The support frame is selectively rotatable relative to the handle around an axis of rotation.

In many embodiments, the dental floss assembly includes a replaceable dental floss unit. For example, in many embodiments, the support frame includes a first mounting portion and a second mounting portion; the dental floss assembly includes a dental floss unit that comprises the length of dental floss; and the dental floss unit is detachably attached to the first mounting portion and the second mounting portion so that the length of dental floss extends between the first mounting portion and the second mounting portion. In many embodiments, the dental floss unit includes a first end member and a second end member; the length of dental floss is attached to the first end member and to the second end member; the first end member is detachably attached to the first mounting portion; and the second end member is detachably attached to the second mounting portion. In many embodiments, the first mounting portion includes a first receptacle in which at least a portion of the first end member is removably disposed; and the second mounting portion includes a second receptacle in which at least a portion of the second end member is removably disposed. In some embodiments, the support frame is elastically deformable by the user to reduce a distance between the first receptacle and the second receptacle to accommodate mounting of the dental floss unit to the support frame and/or demounting of the dental floss unit from the support frame.

In many embodiments, the support frame imparts axial tension into the length of dental floss. For example, in some embodiments, the dental floss unit and the support frame are dimensioned so as to induce elastic strain in the support frame that imparts the axial tension into the length of dental floss.

In some embodiments, the dental floss assembly is detachably attached to a distal end of the handle. In such embodiments, the dental floss assembly can be a replaceable unit that is replaced by detaching a dental floss assembly from the distal end of the handle and attaching a replacement dental floss assembly to the distal end of the handle. In some embodiments, the dental floss assembly includes a support member attached to a distal end of the handle, and the support frame is pivotally coupled to a distal end of the support member.

In some embodiments, the oral hygiene instrument includes an additional oral hygiene instrument attached to the handle opposite to the dental floss assembly or attachable to the handle in place of the dental floss assembly. For example, in some embodiments, the oral hygiene instrument includes a tooth brush attached to the handle. The tooth brush can be detachably attached to the handle. In some embodiments, the oral hygiene instrument includes a tongue scraper that can be detachably attached to the handle in place of the tooth brush. In some embodiments, the oral hygiene instrument includes a tongue scraper attached to the handle. The tongue scrapper can be detachably attached to the handle. In some embodiments, the oral hygiene instrument includes a tooth brush that can be detachably attached to the handle in place of the tongue scraper.

In many embodiments, the oral hygiene instrument is configured so that the length of dental floss can be selectively oriented for flossing between any desired pair of adjacent teeth. For example, in many embodiments, the axis of rotation extends transverse to a direction in which the handle extends; and the length of dental floss extends transverse to the axis of rotation. In some embodiments, the axis of rotation extends perpendicular to the direction in which the handle extends; and the length of dental floss extends perpendicular to the axis of rotation.

In another aspect, a method for fabricating an oral hygiene instrument is provided. The method includes fabricating a handle for gripping by a user, fabricating a dental floss assembly comprising a support frame and a length of dental floss attached to the support frame for flossing between teeth, and coupling the support frame with the handle so that the support frame is selectively rotatable relative to the handle around an axis of rotation.

In many embodiments of the method, the dental floss assembly includes a replaceable dental floss unit. For example, in many embodiments of the method, the support frame includes a first mounting portion and a second mounting portion; and the fabrication of the dental floss assembly includes fabricating a dental floss unit that comprises the length of dental floss and detachably mounting the dental floss unit to the first mounting portion and the second mounting portion so that the length of dental floss extends between the first mounting portion and the second mounting portion. In many embodiments, the fabrication of the dental floss unit includes fabricating a first end member of the dental floss unit, fabricating a second end member of the dental floss unit, and attaching the length of dental floss to the first end member and to the second end member. In many embodiments, the mounting of the dental floss unit includes inserting at least a portion of the first end member into a first receptacle of the first mounting portion and inserting at least a portion of the second end member into a second receptacle of the second mounting portion. In some embodiments, the mounting of the dental floss unit includes elastically deforming the support frame to reduce a distance between the first receptacle and the second receptacle to accommodate mounting of the dental floss unit to the support frame and/or demounting of a used dental floss unit from the support frame.

In many embodiments of the method, the dental floss assembly is fabricated so that the support frame imparts axial tension into the length of dental floss. For example, in some embodiments of the method, the dental floss unit and the support frame are fabricated so as to induce elastic strain in the support frame that imparts the axial tension into the length of dental floss.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
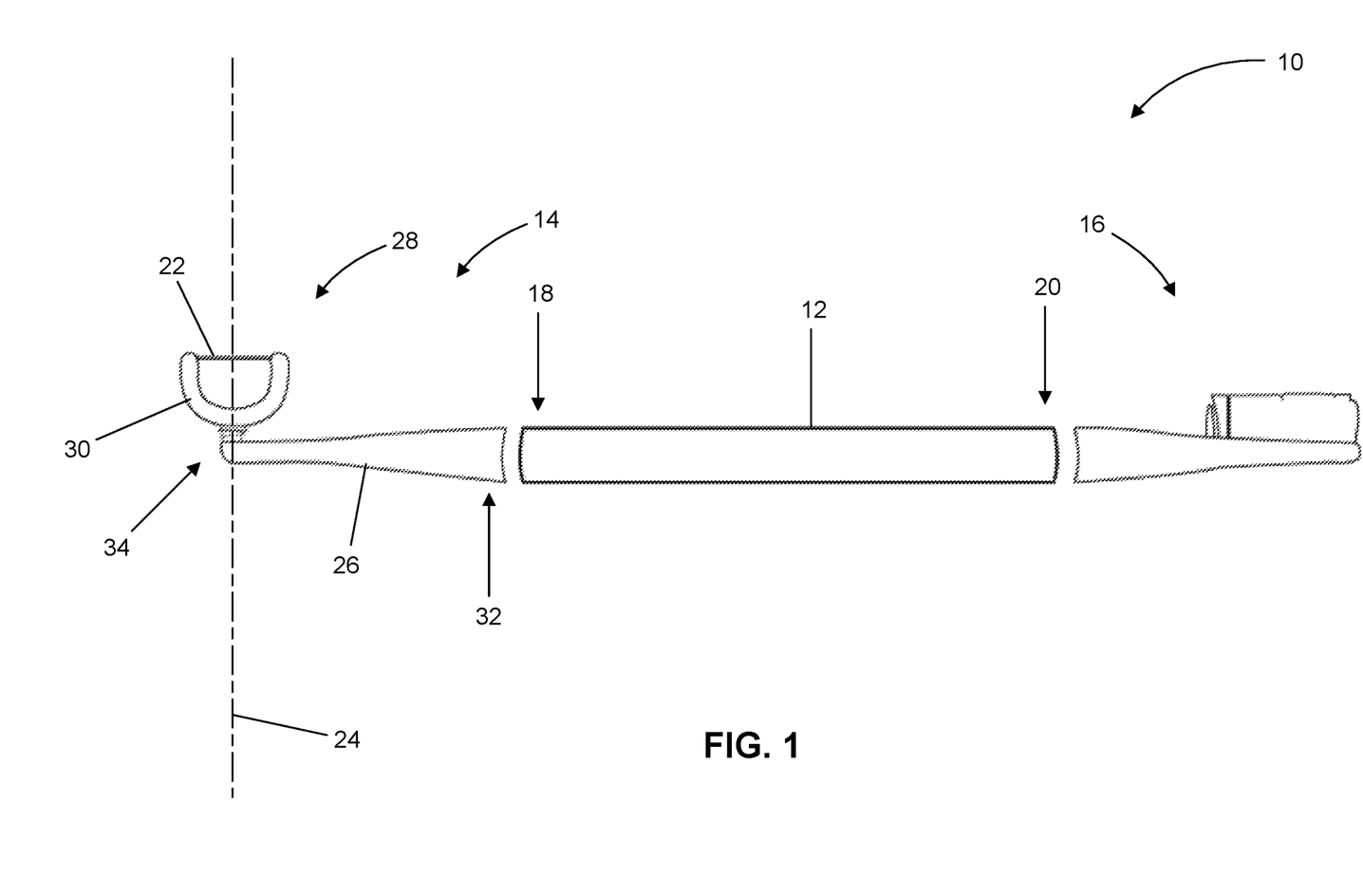
FIG. 1 shows an exploded side view of an oral hygiene instrument, in accordance with embodiments, that includes a handle, a dental floss assembly attached to one end of the handle, and a tooth brush assembly attached to the other end of the handle.

Turning now to the drawings in which like reference identifiers refer to like elements in the various figures, FIG. 1 shows an exploded side view of an oral hygiene instrument 10, in accordance with embodiments. The oral hygiene instrument 10 includes an elongated handle 12, a dental floss assembly 14, and a tooth brush assembly 16. The handle 12 has a first end 18 and a second end 20. The dental floss assembly 14 is attached to the first end 18 of the handle 12.

The tooth brush assembly 16 is attached to the second end 20 of the handle 12. In some embodiments, the tooth brush assembly 16 and the second end 20 of the handle 12 include complementarily-shaped coupling features (e.g., male and female threads) so that the tooth brush assembly 16 is detachably attachable to the handle 12.

The dental floss assembly 14 includes a length of dental floss 22 that can be selectively oriented relative to an axis of rotation 24 for flossing between any desired pair of adjacent teeth. The dental floss assembly 14 includes a support member 26 and a distal-end subassembly 28. The distal-end subassembly 28 includes a support frame 30 and the length of dental floss 22 coupled with and supported by the support frame 30. The support member 26 has a proximal end 32 and a distal end 34. The support frame 30 is pivotally coupled with the distal end 34 of the support member 26 for selective rotation of the support frame 26 around the axis of rotation 24. In many embodiments, the pivotal coupling of the support frame 30 to the support member 26 is adapted to maintain a selected orientation of the support frame 30 relative to the support member 26 absent the application of a suitable minimum amount of torsion to the support frame 30 so as to inhibit or prevent undesired reorientation of the length of dental floss 22 relative to the handle 12 that may otherwise be induced during flossing between the desired pair of adjacent teeth. In some embodiments, the pivotal coupling of the support frame 30 to the support member 26 is adjustable to enable selective adjustment of the minimum amount of torsion that must be applied to the support frame 30 to rotate the support frame relative to the support member 26. The proximal end 32 of the support member 26 is attached to the first end 18 of the handle 12. In some embodiments, the proximal end 32 and the first end 18 include complementarily-shaped coupling features (e.g., male and female threads) so that the support member 26 is detachably attachable to the handle 12.

Figure 2:
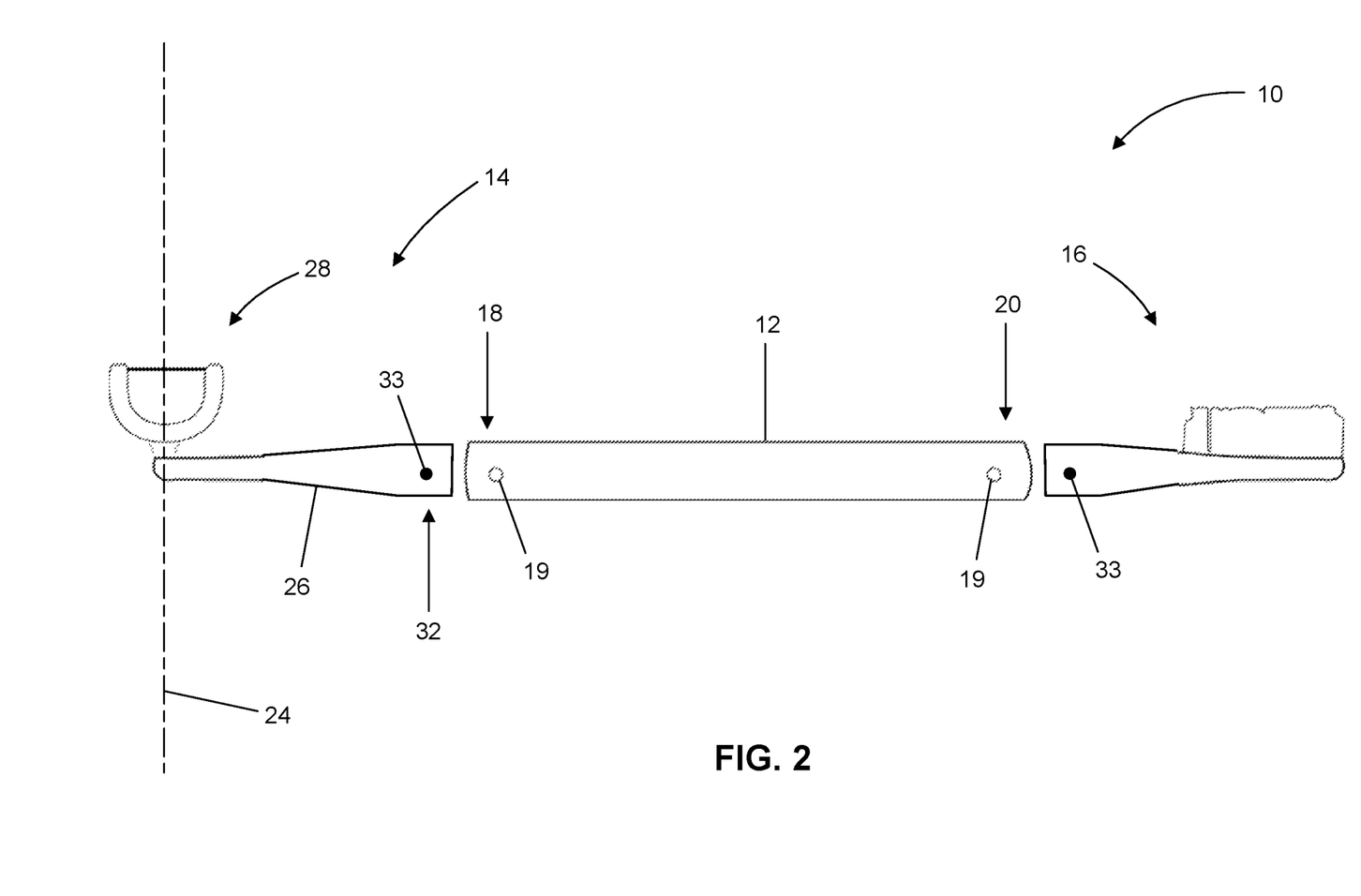
FIG. 2 shows an exploded side view of an embodiment of the oral hygiene instrument of FIG. 1.

FIG. 2 shows an exploded side view of an embodiment of the oral hygiene instrument 10 with quick disconnection features for detachable mounting of the dental floss assembly 14 to the handle 12 and for detachable mounting of the tooth brush assembly 16 to the handle 12. In the illustrated embodiment, the proximal end 32 of the support member 26 is shaped to be received in a complementarily-shaped receptacle in the first end 18 of the handle 12. For example, the proximal end 32 can have a faceted external shape and the first end 18 can have a complimentarily-shaped faceted receptacle so as to prevent relative twisting of the dental floss assembly 14 relative to the handle 12. In the illustrated embodiment, a spring-loaded protruding coupling feature 33 is mounted to the proximal end 32 of the support member 26. The coupling feature 33 can be pressed to reconfigure the coupling feature 33 to accommodate insertion of the proximal end 32 into the end receptacle in the first end 18 of the handle 12. A protruding portion of the coupling feature 33 is sized to be received within a coupling receptacle 19 in the first end 18 of the handle 12. To decouple the dental floss assembly 14 from the handle 12, any suitable tool (e.g., a ball-point pen) can be used to press the coupling feature 33 inward out of engagement with the receptacle 19 to accommodate extraction of the proximal end 32 of the support member 26 from the complementarily-shaped receptacle in the first end 18 of the handle 12. In the illustrated embodiment, the tooth brush assembly 16 is configured similar to the dental floss assembly 14 and the second end 20 of the handle 12 is configured similar to the first end 18 of the handle 12 so that the tooth brush assembly 16 is detachably mountable to the second end 20 of the handle 12 in the same way as the dental floss assembly 14 is detachably mountable to the first end 18 of the handle 12.

Figure 3:
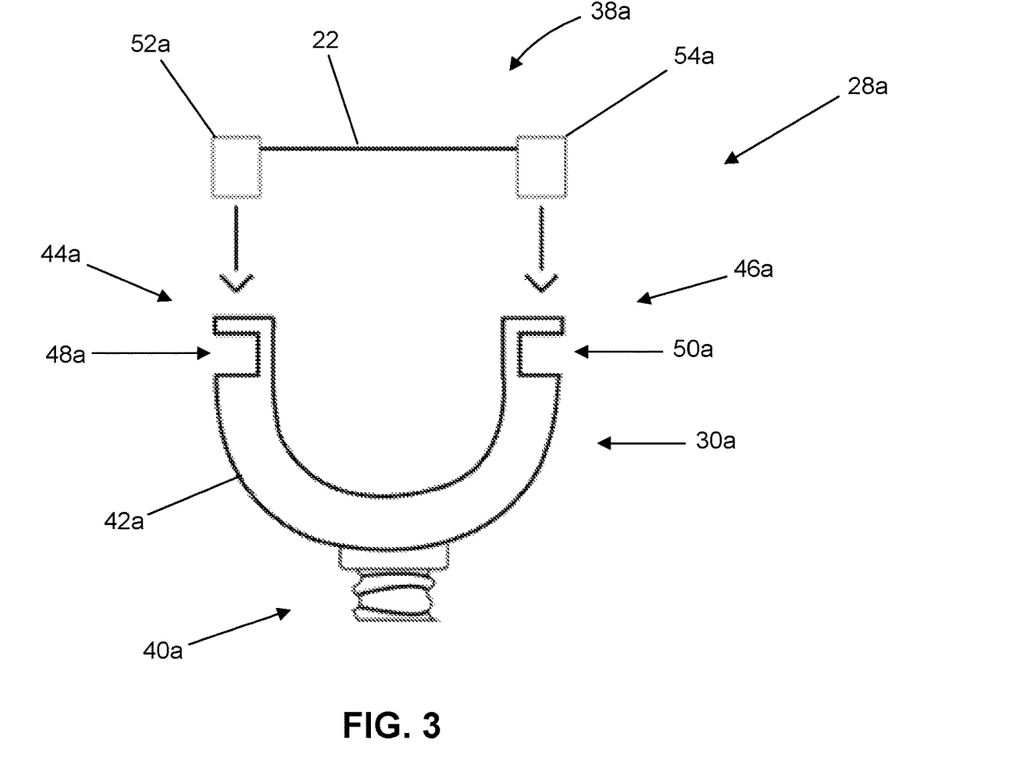
FIG. 3 shows an exploded side view of a support frame and a dental floss unit of an embodiment of a distal-end subassembly of the dental floss assembly of FIG. 1.

FIG. 3 shows an exploded side view of an embodiment 28a of the distal-end subassembly 28. In the illustrated embodiment, the distal-end subassembly 28a includes a support frame 30a and a replaceable dental floss unit 38a. The support frame 30a includes a pivotal mounting portion 40a, a u-shaped frame portion 42a, a first mounting portion 44a, and a second mounting portion 46a. The dental floss unit 38a includes the length of dental floss 22. The dental floss unit 38a is detachably attached to the first mounting portion 44a and the second mounting portion 46a so that the length of dental floss 22 extends under tension between the first mounting portion 44a and the second mounting portion 46a. The first mounting portion 44a includes a first receptacle 48a. The second mounting portion 46a includes a second receptacle 50a. The dental floss unit 38a includes a first end member 52a and a second end member 54a. One end of the length of dental floss 22 is attached to the first end member 52a. The other end of the length of dental floss 22 is attached to the second end member 54a. The dental floss unit 38a is attachable to the support frame 30a by inserting the first end member 52a into the first receptacle 48a and inserting the second end member 54a into the second receptacle 50a. In many embodiments, when the dental floss unit 38a is attached to the support frame 30a, the support frame 30a imparts a suitable magnitude of axial tension into the length of dental floss 22 to inhibit undesired deflection of the length of dental floss 22 during flossing.

Figure 4:
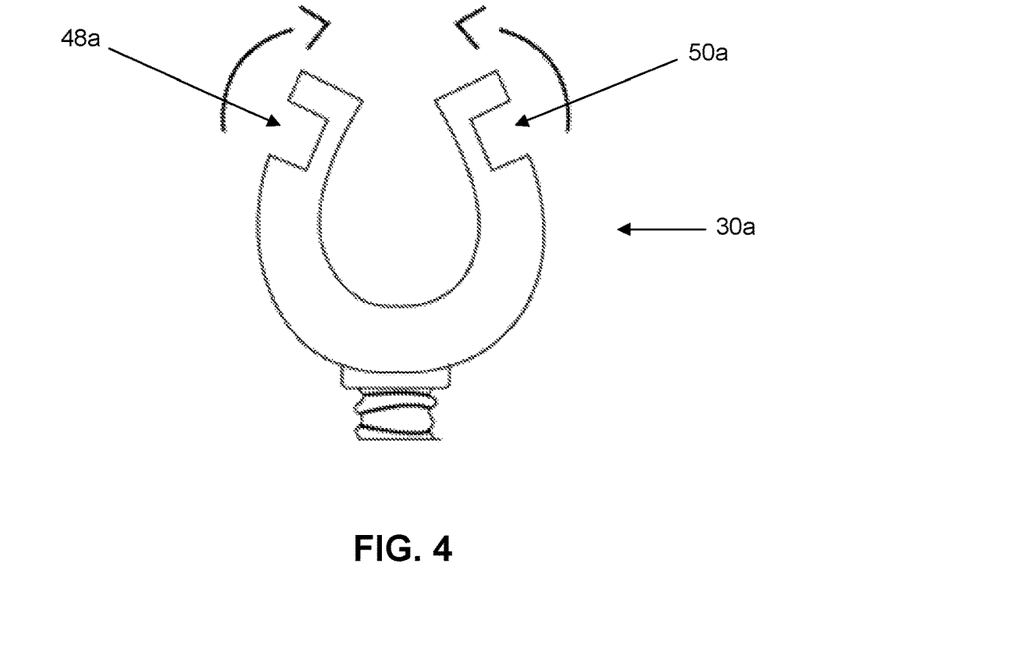
FIG. 4 shows a side view of the support frame of FIG. 3 in an elastically-deformed configuration suitable for mounting of the dental floss unit to the support frame and/or demounting of the dental floss unit from the support frame.

FIG. 4 shows a side view of the support frame 30a in an elastically-deformed configuration suitable for mounting of the dental floss unit 38a to the support frame 30a and/or demounting of the dental floss unit 38a from the support frame 30a. In many embodiments, the support frame 30a is made from a suitable flexible material (e.g., a suitable flexible plastic) and configured so that a user can squeeze the support frame 30a to elastically deform the support frame to reduce a distance between the first receptacle 48a and the second receptacle 50a to accommodate insertion of the first end member 52a into the first receptacle 48a and/or insertion of the second end member 54a into the second receptacle 50a. In many embodiments, the dental floss unit 38a and the support frame 30a are sized so that, when the dental floss unit 38a is mounted to the support frame 30a, residual elastic strain in the support frame 30a imparts a suitable level of axial tension in the length of dental floss 22 to inhibit undesired deflection of the length of dental floss 22 during flossing.

Figure 5:
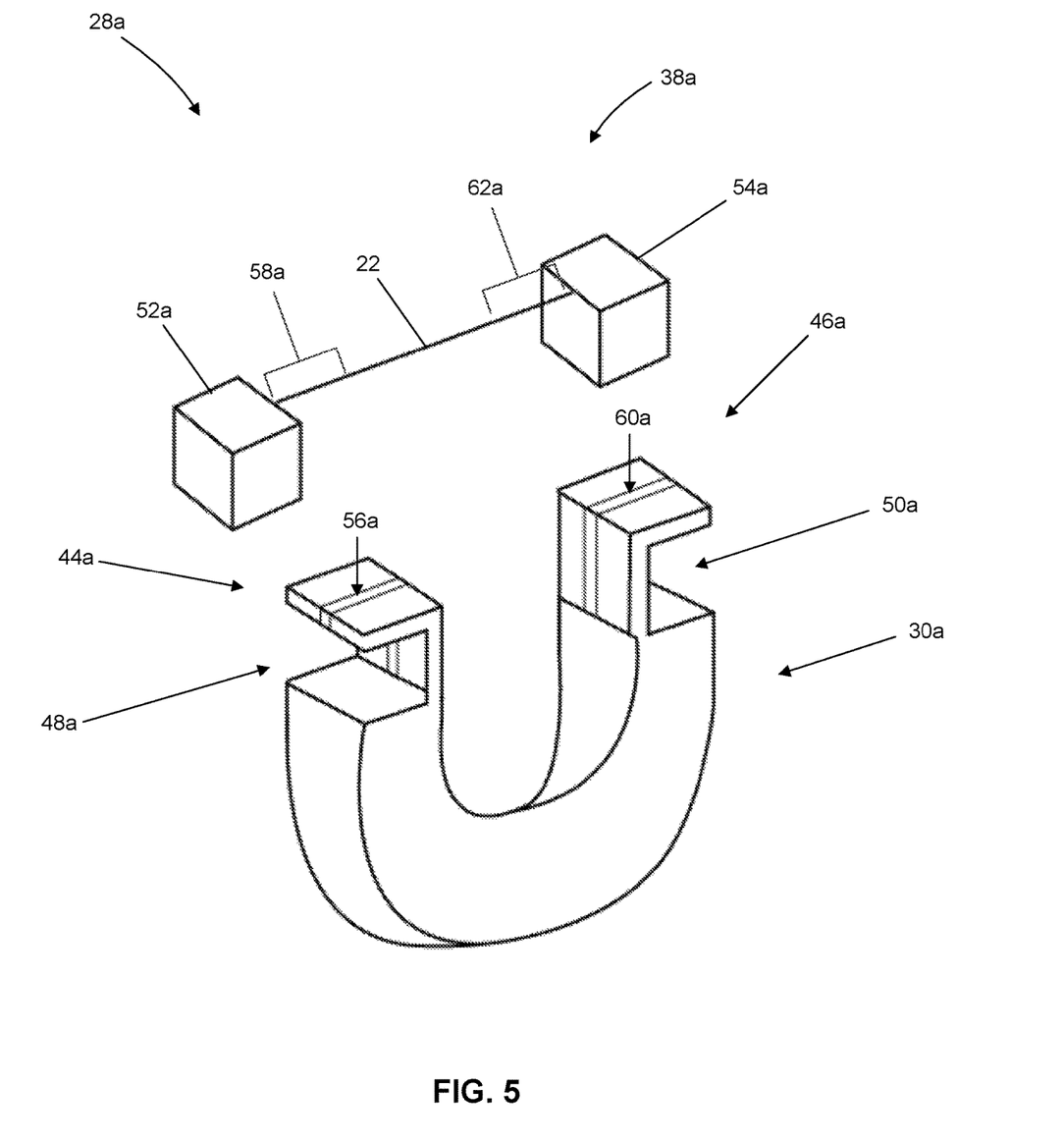
FIG. 5 shows another exploded view of the distal-end subassembly of FIG. 2.

FIG. 5 shows another exploded view of the distal-end subassembly 28a. The first mounting portion 44a includes a slot 56a that accommodates a first end segment 58a of the length of dental floss 22 when the first end member 52a is inserted into the first receptacle 48a. Likewise, the second mounting portion 46a includes a slot 60a that accommodates a second end segment 62a of the length of dental floss 22 when the second end member 54a is inserted into the second receptacle 50a.

Figure 6:
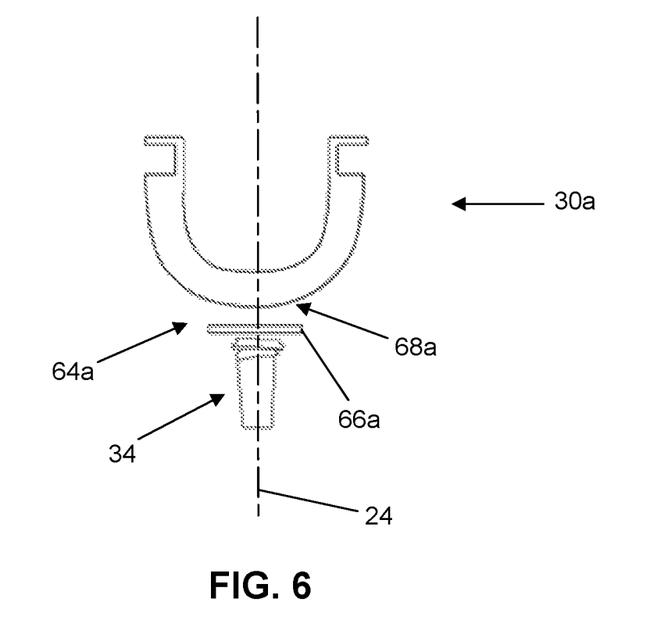
FIG. 6 shows an exploded side view illustrating mounting features for pivotally coupling a support frame to a support member in an embodiment of the dental floss assembly of FIG. 1.
Figure 7:
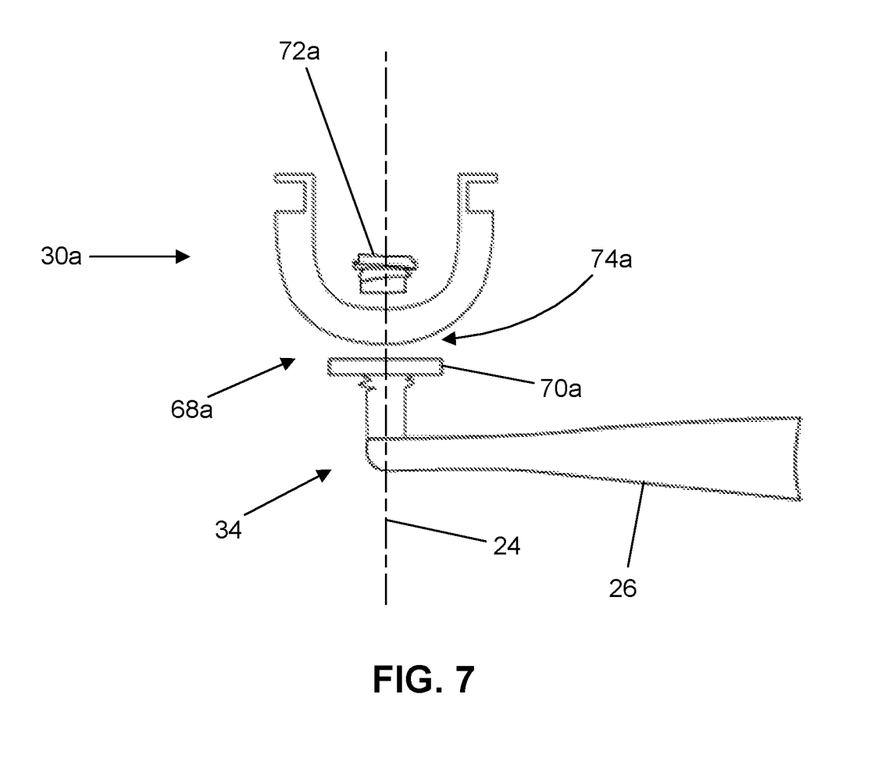
FIG. 7 shows an exploded side view illustrating mounting features for pivotally coupling a support frame to a support member in another embodiment of the dental floss assembly of FIG. 1.

The support frame 30 can be pivotally coupled to the distal end 34 of the support member 26 using any suitable coupling features. For example, FIG. 6 shows an exploded side view illustrating mounting features 64a for pivotally coupling the support frame 30a to the distal end 34 of the support member 26. The mounting features 64a include an attachment plate 66a that is pivotally coupled with the distal end 34 of the support member 26 for selective rotation of the attachment plate 66a around the axis of rotation 24. In the illustrated embodiment, the support frame 30a includes a slot 68a shaped to slidingly receive and interface with the attachment plate 66a to fixedly attach the support frame 30a to the attachment plate 66a, thereby pivotally coupling the support frame 30a to the distal end 34 of the support member 26 for selective rotation of the support frame 30a around the axis of rotation 24 relative to the support member 26. As another example, FIG. 7 shows an exploded side view illustrating mounting features 68a for pivotally coupling the support frame 30a to the distal end 34 of the support member 26. The mounting features 68a include an attachment plate 70a and an attachment fastener 72a. The attachment plate 70a is pivotally coupled with the distal end 34 of the support member 26 for selective rotation of the attachment plate 70a around the axis of rotation 24. In the illustrated embodiment, the support frame 30a includes a receptacle 74a sized and shaped to receive and interface with the attachment plate 70a. The attachment fastener 72a has male threads sized to engage female threads formed in the distal end 34 of the support member 26. When the attachment plate 70a is disposed within the receptacle 74a, the attachment fastener 72a is fastened to the distal end 34 to secure the support frame 30a to the attachment plate 70a. In some embodiments, the attachment fastener 72a can be selectively rotated relative to the distal end 34 of the support member 26 to selectively adjust the minimum amount of torque that must be applied to the support frame 30a to rotate the support frame 30a around the axis of rotation 24 relative to the support member 26.

Figure 8:
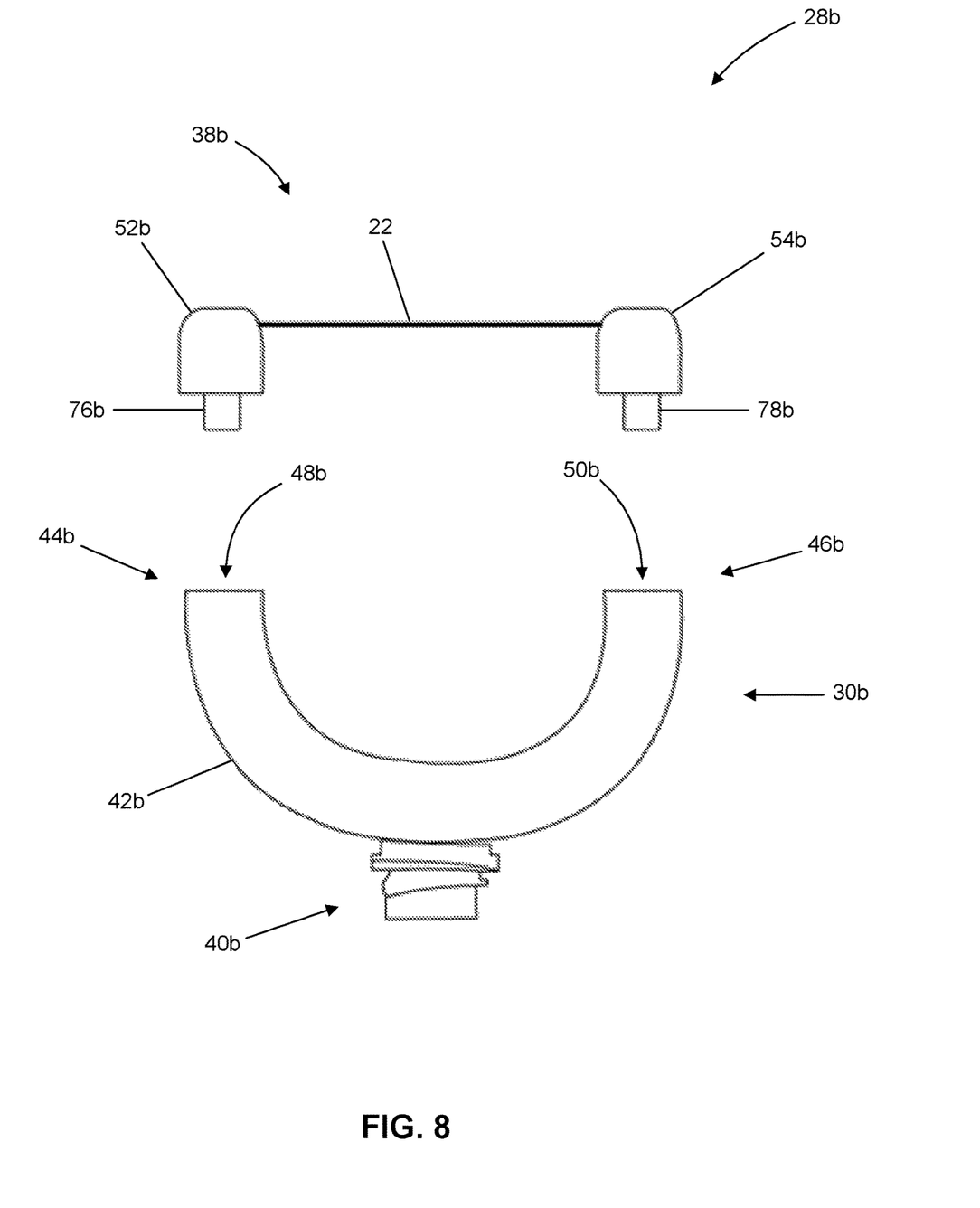
FIG. 8 shows an exploded side view of another embodiment of a distal-end subassembly of the dental floss assembly of FIG. 1.

FIG. 8 shows an exploded side view of another embodiment 28b of a distal-end subassembly 28 of the dental floss assembly 14. In the illustrated embodiment, the distal-end subassembly 28b includes a support frame 30b and a replaceable dental floss unit 38b. The support frame 30b includes a pivotal mounting portion 40b, a u-shaped frame portion 42b, a first mounting portion 44b, and a second mounting portion 46b. The dental floss unit 38b includes the length of dental floss 22. The dental floss unit 38b is detachably attached to the first mounting portion 44b and the second mounting portion 46b so that the length of dental floss 22 extends under tension between the first mounting portion 44b and the second mounting portion 46b. The first mounting portion 44b includes a first receptacle 48b. The second mounting portion 46b includes a second receptacle 50b. The dental floss unit 38a includes a first end member 52a and a second end member 54a. One end of the length of dental floss 22 is attached to the first end member 52a. The other end of the length of dental floss 22 is attached to the second end member 54a. The first end member 52a includes a first male coupling member 76b. The second end member 54b includes a second male coupling member 78b. The dental floss unit 38b is attachable to the support frame 30b by inserting the first male coupling member 76b into the first receptacle 48*b* and inserting the second male coupling member 78*b* into the second receptacle 50*b*. In many embodiments, when the dental floss unit 38*b* is attached to the support frame 30*b*, the support frame 30*b* imparts a suitable magnitude of axial tension into the length of dental floss 22 to inhibit undesired deflection of the length of dental floss 22 during flossing.

Figure 9:
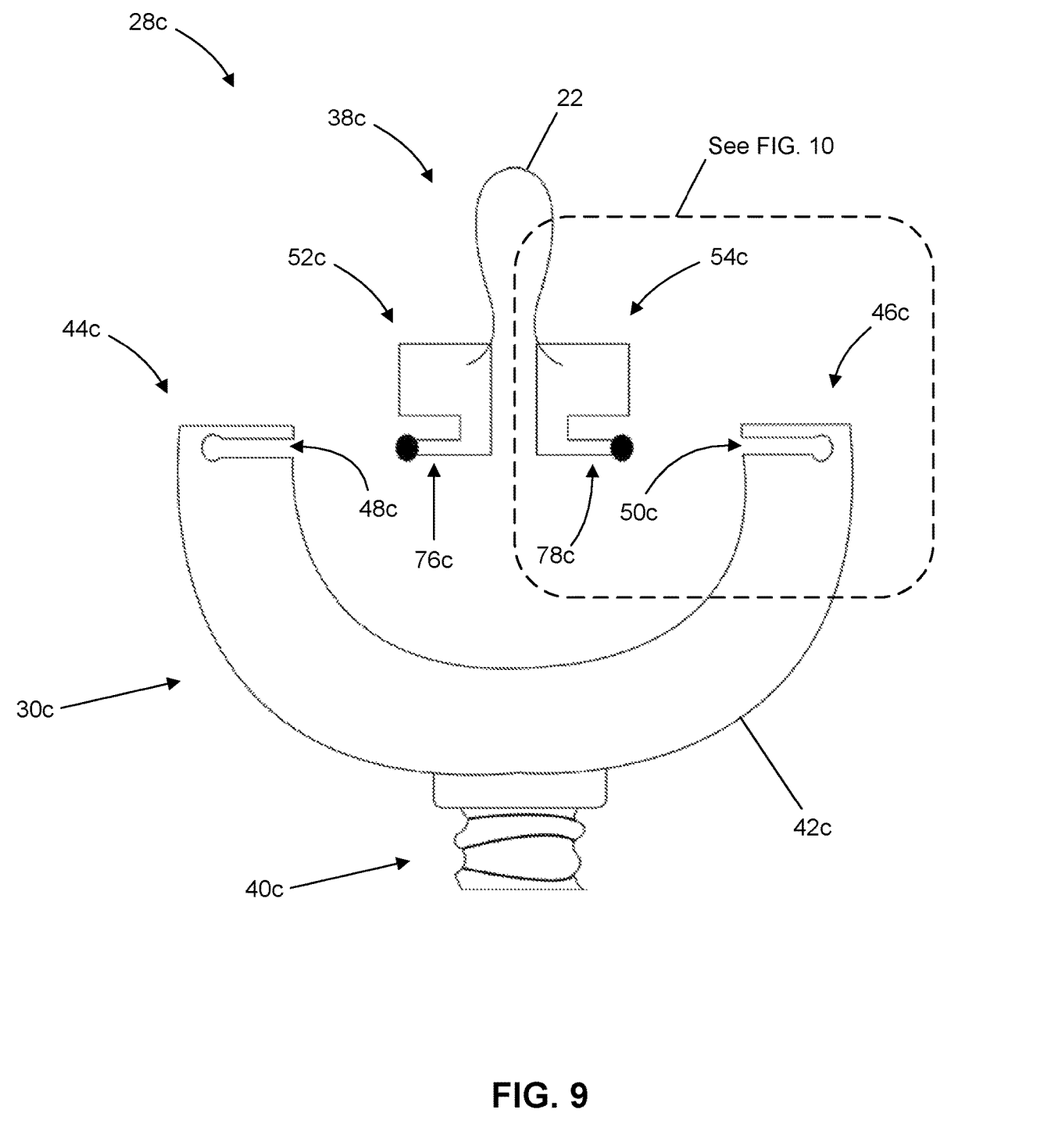
FIG. 9 shows an exploded side view of another embodiment of a distal-end subassembly of the dental floss assembly of FIG. 1.

FIG. 9 shows an exploded side view of another embodiment 28*c* of a distal-end subassembly 28 of the dental floss assembly 14. In the illustrated embodiment, the distal-end subassembly 28*c* includes a support frame 30*c* and a replaceable dental floss unit 38*c*. The support frame 30*c* includes a pivotal mounting portion 40*c*, a u-shaped frame portion 42*c*, a first mounting portion 44*c*, and a second mounting portion 46*c*. The dental floss unit 38*c* includes the length of dental floss 22. The dental floss unit 38*c* is detachably attachable to the first mounting portion 44*c* and the second mounting portion 46*c* so that the length of dental floss 22 extends under tension between the first mounting portion 44*c* and the second mounting portion 46*c*. The first mounting portion 44*c* includes a first receptacle 48*c*. The second mounting portion 46*c* includes a second receptacle 50*c*. The dental floss unit 38*c* includes a first end member 52*c* and a second end member 54*c*. One end of the length of dental floss 22 is attached to the first end member 52*c*. The other end of the length of dental floss 22 is attached to the second end member 54*c*. The first end member 52*c* includes a first male coupling member 76*c*. The second end member 54*c* includes a second male coupling member 78*c*. The dental floss unit 38*c* is attachable to the support frame 30*c* by inserting the first male coupling member 76*c* into the first receptacle 48*c* and inserting the second male coupling member 78*c* into the second receptacle 50*c*. In many embodiments, when the dental floss unit 38*c* is attached to the support frame 30*c*, the support frame 30*c* imparts a suitable magnitude of axial tension into the length of dental floss 22 to inhibit undesired deflection of the length of dental floss 22 during flossing.

Figure 10:
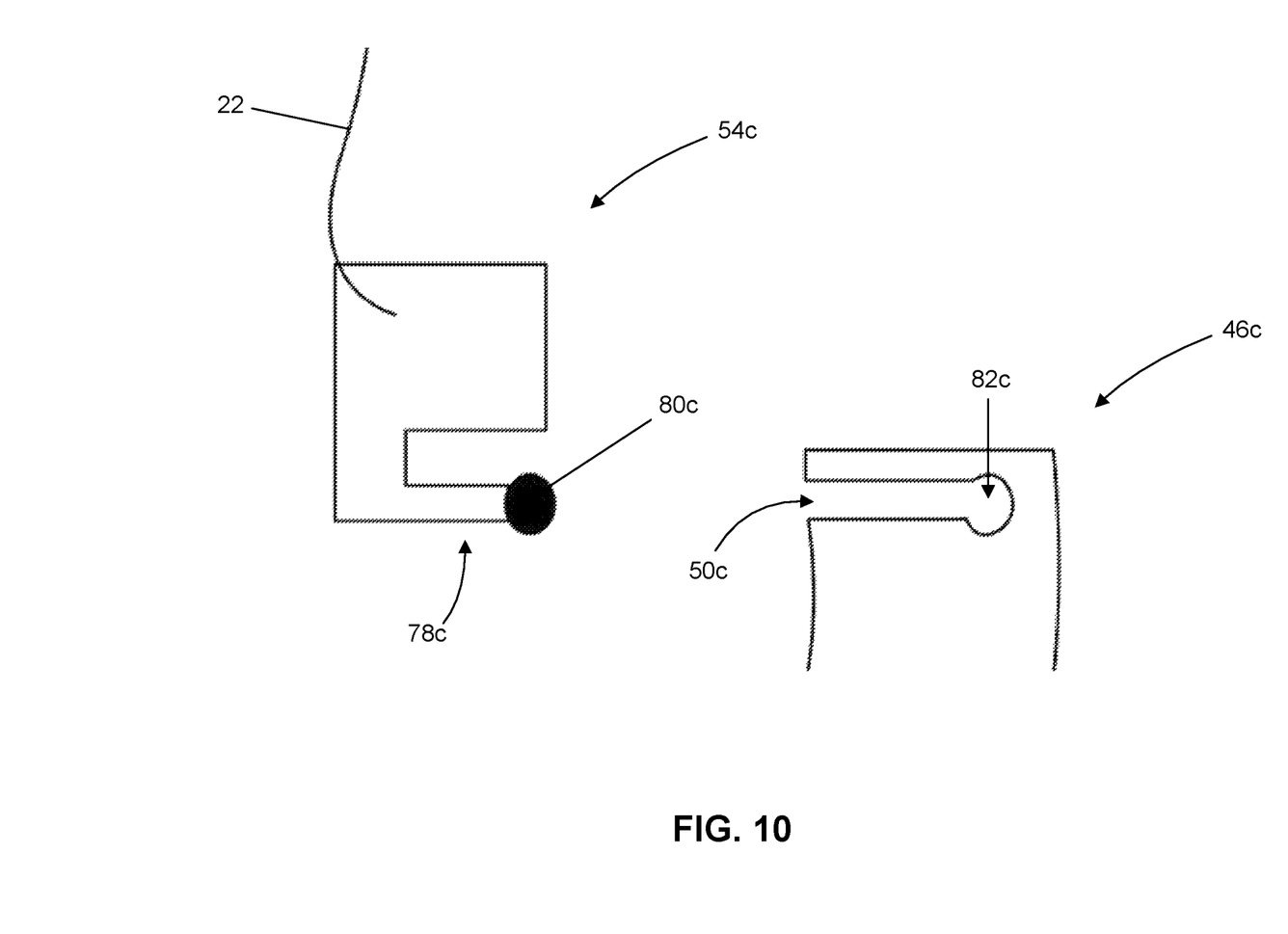
FIG. 10 shows a close-up view showing an end member of a dental floss unit and a support frame mounting portion of the distal-end subassembly of FIG. 9.

FIG. 10 shows a close-up view of the second end member 54*c* and the second mounting portion 46*c* of the distal-end subassembly 28*c* shown in FIG. 9. The second male coupling member 78*c* includes an end retention member 80*c* at a free end of the second male coupling member 78*c*. The end retention member 80*c* protrudes transverse relative to the rest of the second male coupling member 78*c* with respect to an elongate direction of the second male coupling member 78*c* so that, when the end retention member 80*c* is disposed within a complementarily-shaped recess portion 82*c* of the second receptacle 50*c*, engagement between the end retention member 80*c* and the recess portion 82*c* retains the second male coupling member 78*c* to the second mounting portion 46*c* during flossing and accommodates demounting of the second end member 54*c* from the second mounting portion 46*c* during replacement of the dental floss unit 38*c*. The end retention member 80*c* can have any suitable shape. For example, in the illustrated embodiment, the end retention member 80*c* has a cylindrical shape and the recess portion 82*c* has a complementary cylindrical shape sized to receive the end retention member 80*c*. In many embodiments, the first end member 52*c* is configured similar to the second end member 54*c*. In many embodiments, the first mounting portion 44*c* is configured similar to the second mounting portion 46*c*.

Figure 11:
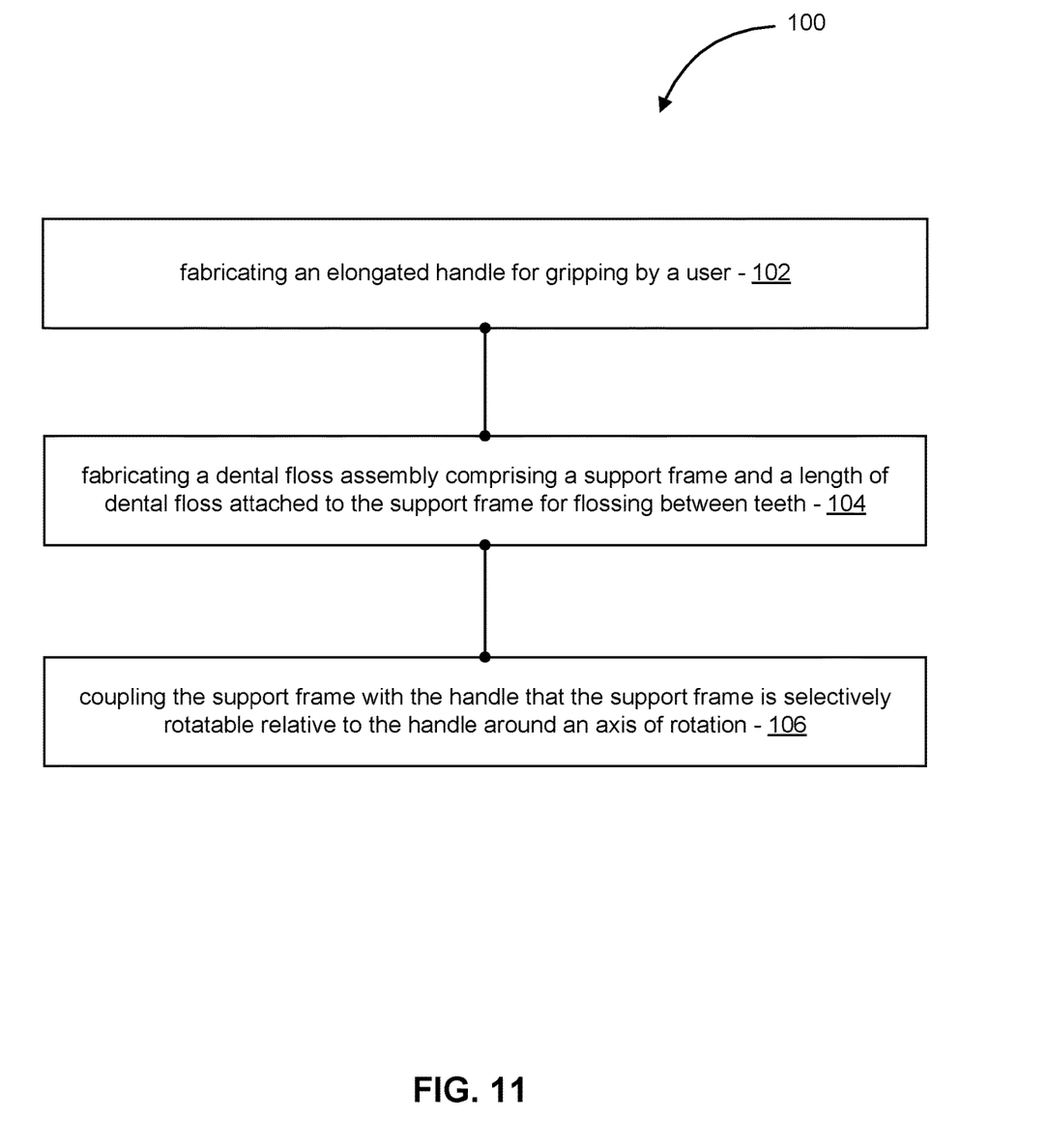
FIG. 11 is a simplified schematic diagram of a method of fabricating an oral hygiene instrument, in accordance with embodiments.

FIG. 11 is a simplified schematic diagram of a method 100 of fabricating an oral hygiene instrument, in accordance with embodiments. The method 100 can be used to fabricate any corresponding oral hygiene instrument, including the oral hygiene instrument 10 described herein. The method 100 includes fabricating an elongated handle for gripping by a user (act 102); fabricating a dental floss assembly comprising a support frame and a length of dental floss attached to the support frame for flossing between teeth (act 104); and coupling the support frame with the handle so that the support frame is selectively rotatable (e.g., by the user) relative to the handle around an axis of rotation (act 106).

Any suitable variation of the method 100 can be practiced. For example, in many embodiments of the method 100, the support frame includes a first mounting portion and a second mounting portion, and fabrication of the dental floss assembly includes fabricating a dental floss unit that includes the length of dental floss and detachably mounting the dental floss unit to the first mounting portion and the second mounting portion so that the length of dental floss extends between the first mounting portion and the second mounting portion. In many embodiments, the fabrication of the dental floss unit includes fabricating a first end member of the dental floss unit, fabricating a second end member of the dental floss unit, and attaching the length of dental floss to the first end member and to the second end member. In many embodiments, the mounting of the dental floss unit includes inserting at least a portion of the first end member into a first receptacle of the first mounting portion and inserting at least a portion of the second end member into a second receptacle of the second mounting portion. In many embodiments, the mounting of the dental floss unit comprises elastically deforming the support frame to reduce a distance between the first receptacle and the second receptacle to accommodate mounting of the dental floss unit to the support frame and/or demounting of a used dental floss unit from the support frame.

Other variations are within the spirit of the present invention. For example, the tooth brush assembly 16 can be omitted or can be detachably attached to the handle. In some embodiments, the oral hygiene instrument includes a tongue scraper that can be detachably attached to the handle in place of the tooth brush. In some embodiments, the oral hygiene instrument includes a tongue scraper attached to the handle. The tongue scrapper can be detachably attached to the handle. In some embodiments, the oral hygiene instrument includes a tooth brush that can be detachably attached to the handle in place of the tongue scraper. In some embodiments, the length of dental floss is replaceable and the support frame includes dental floss attachment features adapted to hold the replaceable length of dental floss. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An oral hygiene instrument comprising:
   a handle for gripping by a user;
   a dental floss unit comprising a length of dental floss, a first end member, and a second end member; wherein a first end of the length of dental floss is attached to the first end member, and wherein a second end of the length of dental floss is attached to the second end member;
   a support frame, the support frame comprising:
      a pivotal mounting portion, wherein the pivotal mounting portion is pivotally coupled with the handle for selective rotation of the support frame relative to the handle around an axis of rotation; and
      a u-shaped frame portion, the u-shaped frame portion forming opposing first and second arms, each arm comprising:
         an inner surface and an opposing outer surface, where the inner surface of the first arm faces the inner surface of the second arm; and
         a first receptacle, and a second receptacle, where the u-shaped frame portion extends between and separates the first receptacle and the second receptacle such that the first and second receptacles face each other and each extend inwardly from inner surface of each respective arm, forming a recess;
   wherein the first end member of the dental floss unit comprises a first male coupling member with a first protruding retention member extending therefrom that is configured to extend into the first receptacle,
   wherein the second end member of the dental floss unit comprises a second male coupling member with a second protruding retention member extending therefrom that is configured to extend into the second receptacle,
   wherein the first receptacle is shaped to accommodate and retain the first protruding retention member so as to inhibit removal of the first male coupling member from the first receptacle,
   wherein the second receptacle is shaped to accommodate and retain the second protruding retention member so as to inhibit removal of the second male coupling member from the second receptacle; and
   wherein the u-shaped frame portion is configured to be resiliently deformed such that a distances is reduced between the first and second receptacles to accommodate insertion/removal of the first and second end members of the floss unit into/from respective first and second receptacles.

2. The oral hygiene instrument of claim 1, further comprising a tooth brush assembly attached to the handle.

3. The oral hygiene instrument of claim 1, wherein:
   the axis of rotation extends transverse to a direction in which the handle extends; and
   the length of dental floss extends transverse to the axis of rotation.

4. The oral hygiene instrument of claim 1, further comprising an attachment fastener that can be selectively rotated to adjust an amount of resistance of rotation of the support frame relative to the handle.

* * * * *